United States Patent
Vendrow et al.

(10) Patent No.: US 9,455,942 B2
(45) Date of Patent: Sep. 27, 2016

(54) CONVERSATION TIMELINE FOR HETEROGENEOUS MESSAGING SYSTEM

(71) Applicant: RingCentral, Inc., San Mateo, CA (US)

(72) Inventors: Vlad Vendrow, Redwood Shores, CA (US); Patrice Khawam, San Francisco, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/173,700

(22) Filed: Feb. 5, 2014

(65) Prior Publication Data

US 2015/0222572 A1    Aug. 6, 2015

(51) Int. Cl.
*G06F 3/00* (2006.01)
*H04L 12/58* (2006.01)

(52) U.S. Cl.
CPC .............. *H04L 51/16* (2013.01); *H04L 51/02* (2013.01)

(58) Field of Classification Search
USPC ................................................ 715/751, 758
See application file for complete search history.

(56) References Cited

U.S. PATENT DOCUMENTS

| | | | |
|---|---|---|---|
| 8,412,845 B2* | 4/2013 | Katis et al. | 709/234 |
| 2005/0091327 A1* | 4/2005 | Koch | G06Q 10/10 709/206 |
| 2005/0251555 A1* | 11/2005 | Little | 709/206 |
| 2013/0179272 A1* | 7/2013 | Bonev et al. | 705/14.66 |

* cited by examiner

*Primary Examiner* — Thanh Vu
(74) *Attorney, Agent, or Firm* — Finnegan, Henderson, Farabow, Garrett & Dunner LLP

(57) ABSTRACT

A conversation timeline for a heterogeneous messaging system. In one embodiment, a method performed by one or more computing devices comprises: maintaining a conversation among users, the conversation comprising a plurality of messages between the users, each of the plurality of messages being a member of one of a plurality of predefined message classes, one of the plurality of messages being a member a different predefined message class of the plurality of predefined message classes than at least one other of the plurality of messages; causing display of a graphical representation of the conversation to one of the users; selecting a reply message class of the plurality of predefined message classes based on one or more reply control selection factors; and causing display, in association with display of the graphical representation of the conversation, reply message controls for adding a new message to the conversation in the reply message class.

28 Claims, 5 Drawing Sheets

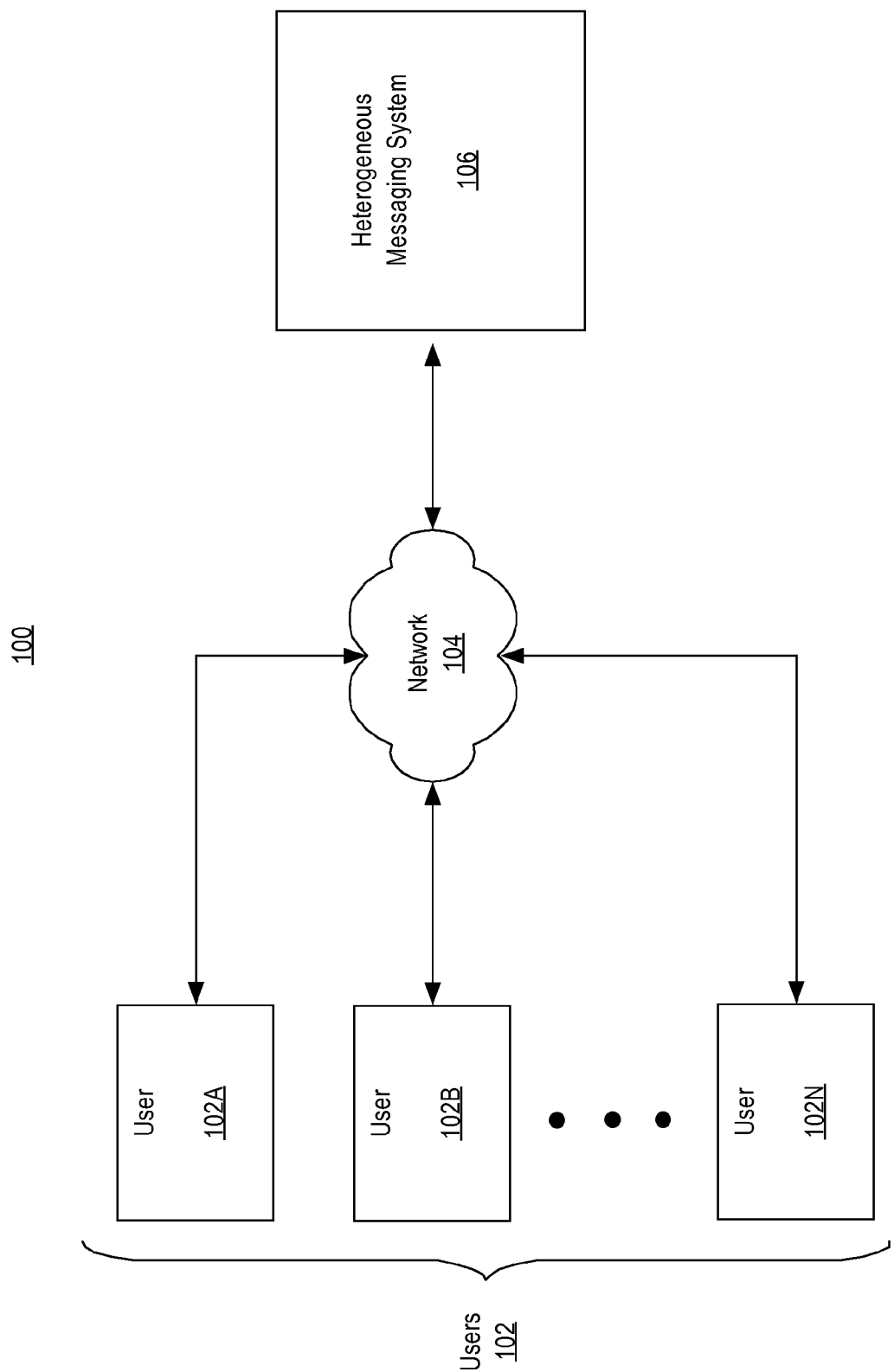

CONVERSATION TIMELINE FOR HETEROGENEOUS MESSAGING SYSTEM

TECHNICAL FIELD

The disclosed embodiments relate generally to electronic messaging systems. More particularly, the disclosed embodiments are related to methods, systems, and user interfaces for a conversation timeline for a heterogeneous messaging system.

BACKGROUND

With the proliferation of the Internet and mobile computing, everyone expects to remain connected with others at all times, anywhere he or she may travel. Fundamentally, people expect to be able to send and receive electronic messages virtually anywhere in the world where there is network connectivity. This expectation has been fueled by the explosion of inexpensive personal mobile computing devices, such as laptop computers, tablet computers, personal digital assistant (PDA) devices, cell phones, and smart phones, and the near ubiquity of wired and wireless broadband Internet connectivity.

Despite the widespread usage of electronic messages for more than a decade, no electronic message format or class of electronic message formats has become dominant. It is not uncommon for one to use his or her personal computing device to send and receive messages in multiple different electronic message formats. Some classes of electronic messaging formats have been available for a long time, such as phone calls, faxes, and e-mail; others are very new, such as videoconferencing, teleconferencing, SMS texts, and chat. The actual format of the message is of little consequence to users; they expect to be able to communicate with others using whatever device or message format is appropriate or available at the time.

At the same time, because personal mobile computing devices have become so inexpensive and near replacements for traditional desktop computers and landline telephones, many people possess many different devices and use each device to send and receive electronic messages. A user may interact with another person by exchanging messages with that other person using different devices and different types of messages. A user may, for instance, send an e-mail to a customer through his or her laptop computer, the customer may respond with an SMS text message to the user's smart phone, and the user may respond by faxing the customer a document through an electronic faxing service.

Navigating a morass of messages of heterogeneous types spread across multiple devices has historically been a time-consuming and confusing process. Users typically must access different devices—or even different applications within a single device—to retrieve snippets of the conversation and mentally piece them together into a cohesive whole. It would be helpful to give users a way to easily view and reply to electronic messages they send and receive at and from their personal computing devices, especially in situations where the users send and receive different types, classes, or formats of electronic messages with their personal computing devices. The present invention provides a solution for this and other needs.

SUMMARY

A conversation timeline for a heterogeneous messaging system that may be displayed in a graphical user interface to a user of the system is described. For example, the conversation timeline can be displayed in a graphical user interface on the user's portable personal computing device (e.g., a cell phone, a tablet computer, a laptop computer, a car infotainment system).

The timeline includes a listing of one or more conversations. Each conversation includes one or more messages between at least two users of the system. For example, one of the users can be the user to which the conversation timeline is presented.

Each message of a conversation may be a member of one of a number of predefined message classes. For example, the predefined messages classes can include, but are not limited to, a voice message class, a fax message class, and a text message class.

The timeline further includes selectable links that, when selected, provide graphical user interface controls for adding new messages of the different predefined message classes to conversations associated with the controls. For example, the controls associated with a conversation that includes a recent fax message can allow the user to add new phone or new text message to the conversation.

The preceding summary is merely one example embodiment of present invention and is not intended to be limiting of the invention. Other embodiments and aspects of the present invention will be apparent to those skilled in the art from the drawings and the following detailed description.

BRIEF DESCRIPTION OF THE DRAWINGS

Various embodiments of the invention are disclosed herein, in conjunction with the following drawings in which like reference numerals refer to corresponding parts throughout the figures.

FIG. 1 is a block diagram of an exemplary distributed computing environment for a conversation timeline, according to certain embodiments of the present invention;

DETAILED DESCRIPTION

Figure 2A:
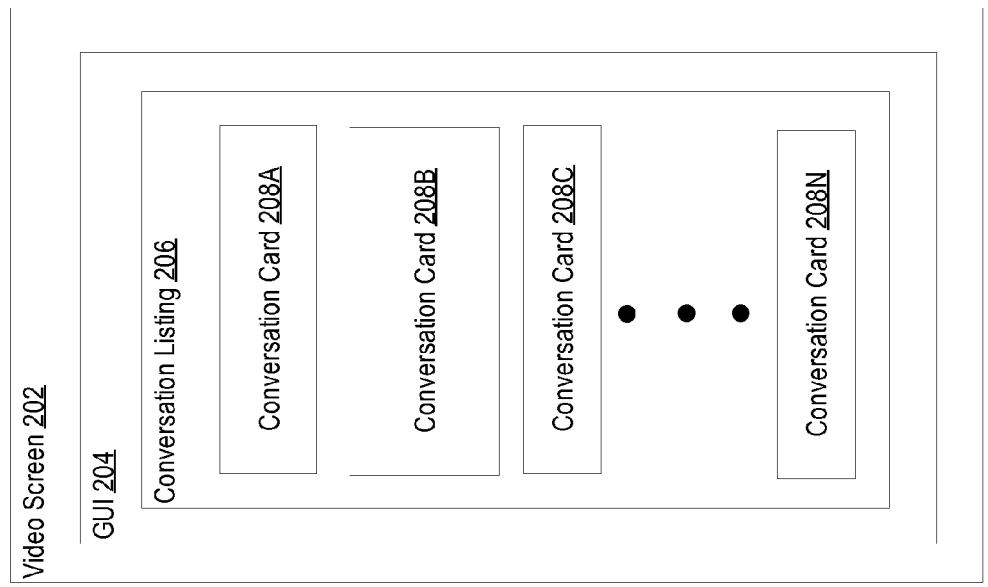
FIG. 2A illustrates a wireframe of an exemplary graphical user interface containing a conversation timeline, according to certain embodiments of the present invention.

Methods, systems, user interfaces, and other aspects of the invention are described. In the following specification, embodiments of the invention are described with reference to numerous specific details that may vary from implementation to implementation. The specification and drawings are, accordingly, to be regarded in an illustrative rather than a restrictive sense.

Also, in the following description for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example Distributed Computing Environment

FIG. 1 is a block diagram of an exemplary distributed computing environment for a conversation timeline. Users 102, such as user 102A, user 102B, and user 102N, are in communication with heterogeneous messaging system 106 via network 104. Heterogeneous messaging system 106 can include a heterogeneous messaging web service, one or more servers operating the heterogeneous messaging web service, or any other device or application facilitating the sending and receiving of at least two different classes of electronic messages between users 102 via network 104.

The different classes of electronic messages facilitated by heterogeneous messaging system 106 can include, but are not limited to, voice messages, fax messages, text messages, e-mails, videoconferences, voice messages, and phone calls. In this context, the term "message" refers broadly to virtually any electronic communication (whether written, audio, visual, or otherwise), or a record thereof, facilitated by system 106 between users 102 of system 106.

An electronic communication from one user to another user need not be received for the communication to be considered a message. For example, user 102A may place a phone call to user 102B which is not answered by user 102B. The outgoing call from user 102A can be considered a message as well as the missed call by user 102B. If user 102A also leaves a voice mail message for user 102B, the voice mail message can also be considered a message.

As mentioned, heterogeneous messaging system 106 can support sending and receiving different classes of electronic messages. In some embodiments, the different classes include a voice message class including voice messages, a fax message class including fax messages, and a text message class including text messages.

Message classes may be mutually exclusive of one another. That is, a message that is in one message class may not also be a member of any of the other predefined message classes. However, there is no requirement that message classes be mutually exclusive and the heterogeneous messaging system 106 may support multi-class messages in which a message belongs to more than one of the predefined message classes.

Generally, a message class may be defined by the content of the messages in the class and the network communications protocol(s) used by system 106 to facilitate sending and receiving of the messages in the class. For example, the content of messages in a phone message class can be digitally encoded voice, audio, and/or video and the sending and receiving of the voice messages may be facilitated by system 106 according to a Voice over Internet Protocol (VoIP) or other network communications protocol for delivery of voice communications and multimedia sessions over Internet Protocol (IP) networks.

System 106 may use other network communications protocols to facilitate the sending and receiving of phone messages over non-IP networks such as, for example, network communications protocol(s) for facilitating the sending and receiving of phone messages over a Public-Switched Telephone Network (PSTN).

Phone messages in the phone message class may be part of a voice-only or audio-only communications session (e.g., a phone call between users 102) or part of a multimedia (e.g., video and audio) communications session (e.g., a video teleconference between users 102).

As another example of a message class, the content of messages in a fax message class can be digitally encoded document(s). For example, a faxed document can be digitally encoded in a Tagged Image File Format (TIFF), a Portable Document Format (PDF), or a Multipurpose Internet Mail Extensions (MIME) format.

The original document or documents sent as a fax can be physical (e.g., printed paper) or also digitally encoded documents, which may be a different digital encoding document format than the digital encoding document format used to send and receive the original document as a fax.

The network communications protocol(s) used by system 106 to send and receive fax messages may be varied and involve different types of communications networks. For example, system 106 may use a traditional fax messaging protocol (e.g., please provide an example of a traditional fax messaging protocol) for sending and receiving fax messages over a PSTN, an electronic mail protocol (e.g., the Simple Mail Transport Protocol (SMTP)) for sending and receiving faxes over IP-based networks as MIME formatted attachments to electronic mail messages, and/or a VoIP protocol (e.g., T.38) for sending and receiving faxes over IP networks.

As yet another example of a message class, the content of messages in a text message class can include text, images, video, and/or audio formatted in a Short Message Service (SMS) or a Multimedia Messaging Service (MMS) format.

Overall, system 106 supports sending and receiving heterogeneous classes of electronic messages that have different electronic message formats, including possibly multiple different electronic message formats in the same class, and supports sending and receiving heterogeneous classes of electronic messages using different network communications protocols, including possibly multiple different network communications protocols within the same class.

Users 102 can access the services provided by heterogeneous messaging system 106 via network 104. Optionally, one or more of users 102 may be able to access heterogeneous messaging system 106 directly.

Network 104 may actually be composed of multiple, possibly different, sub-networks. For example, network 10 may include the Internet and the Public Switched Telephone Network (the PSTN).

Further, different users 102 may interact with system 106 over different sub-networks of network 104. For example, some users 102 may access the services provided by system 106 over the PSTN while other users 102 interact with system 106 over the Internet.

Network 104 may also be a local network serving a relatively small geographic area such as one that serves a home, business, school, university, organization, etc.

Users 102 may use a personal computing device, portable or stationary, such as a laptop or desktop computer, a tablet computer, a cellular telephone, a personal digital assistant (PDA), a set top box, a desktop phone, an IP phone, and so forth to access the heterogeneous messaging system 106.

Some users 102 may subscribe, either free of charge or on a pay-for basis, to a heterogeneous messaging service provided by system 106, in which case such users 102 have user accounts with the service. By such access, subscribing users can send and receive messages to and from other users 102, view a conversation timeline, enter user profile information about themselves, configure messaging preferences, and so forth. Such user accounts can be associated with a unique identifier (such as a phone number or phone numbers provided by the service, or an e-mail address associated with the user) with which the subscribing users can send and receive heterogeneous messages to and from other users 102. For example, the heterogeneous messaging service may allow subscribing users to send and receive voice message, fax messages, and text messages at the same phone number.

Other users 102 may not subscribe to the heterogeneous messaging service but nevertheless send a message to a subscribing user or receive a message sent from a subscribing user via heterogeneous messaging system 106. Such sending or receiving may involve separate messaging services that the non-subscribe users subscribe to. As such, non-subscribing users that send or receive messages to or from subscribing users via system 106 are also considered users 102 of system 106.

According to exemplary embodiments, users 102, such as user 102A, sends and/or receives one or more messages in one or more predefined message classes via system 106. The messages may be sent from and received at users personal computing devices. The sent and received messages may be processed by system 106. For example, user 102A may initiate a phone call to user 102B at user 102B's phone number.

System 106 may handle the incoming call in a number of different ways, possibly depending on user 102B's call handling preferences. For example, system 106 may route the incoming call directly to user 102B's voice mail or attempt to connect the incoming call to one of user 102B's personal computing devices. More generally, system 106 may handle messages in virtually any manner that is appropriate for the particular class of message being handled.

System 106 may handle different types of messages within a class of messages. Generally, the type of the message results from how the message is handled by system 106. Examples of types of messages in a phone message class may include missed phone call messages for phone calls that were routed by system 106 to subscribing users' personal computing devices but that were not answered by the subscribing users, received phone call messages for phone calls that were routed by system 106 to subscribing users' personal computing devices and that were answered by the subscribing users, outgoing phone call messages for incoming phone calls from subscribing users' personal computing devices handled by system 106, and voicemail phone messages for incoming phone calls to subscribing users routed by system 106 to the subscribing users' voicemail. Examples of types of messages within a fax message class may include fax messages sent from subscribing users' personal computing devices that were handled by system 106 and fax messages received at subscribing users' personal computing devices from system 106. Examples of types of messages within a text message class may include text messages sent from subscribing users' personal computing devices that were handled by system 106 and text messages received at subscribing users' personal computing devices from system 106.

Introduction to Conversations

In accordance with embodiments of the present invention, messages handled by system 106 are grouped into "conversations." A conversation is a set of messages, irrespective of type, exchanged between two or more users with respect to a subject.

A conversation can include a grouping of one or more reply messages with their original message. The messages grouped in a conversation can include messages belonging to different message classes. For example, the original message of a conversation may be a fax of a document sent from user 102A via system 106 and received by user 102B. The conversation may also include a reply text message to the original fax message stating, for example, "received your fax" sent by user 102B via system 106 and received by user 102A.

By grouping all reply messages with their original message into a conversation, users 102 can view replies to an original message (and replies to those replies) in one place, thereby making it easier to understand the context of a message in the conversation or to follow the conversation. This is possible even if the original message and the reply messages belong to different message classes.

Messages in a conversation may each be associated with a sender user and one or more recipient users. In some cases, the identity of the sender and recipient users is indirectly indicated by the message. For example, a message may be associated with the sender's phone number and a recipient's phone number.

User profile details about the sender or recipient can be obtained using the associated phone number (or other identifier) as a key to a user profile database (e.g., a contact list) or an online service (e.g., an online social networking service) that provides provide user profile information associated with a given a phone number (or other identifier). In some cases, the sender or a recipient user is directly identified in a message by a subscriber identifier or other identifier (e.g., e-mail address) of a user account the sender or recipient user has with the heterogeneous messaging service provided by system 106. In these cases, user profiles details may be obtained from the user account record held with the service in addition to or instead of user profile details obtained from another user profile database or an online service.

Messages in a conversation may each be associated with dates and times. For example, a message in a conversation may be associated with a date and time the message was sent or a date and time the message was received.

Messages in a conversation may be ordered, among other ways, chronologically based on dates and times associated with the messages. For examples, the messages in a conversation may be ordered from most recent to least recent or from least recent or most recent based on the sent or received dates and times associated with the messages.

Conversations may also be ordered in a chronological order based on the dates and times associated with the messages in the conversations. For example, a set of conversations can be ordered chronologically from most recent to least recent based on the most recent message in each of the conversations in the set. For example, if a conversation C1 has messages A, B, and C and conversation C2 has messages D and E where message D is the most recent message among all messages A, B, C, D, and E; message A is the next most recent message among all of the messages; and message E is next most recent message after message A among all of the messages, then the set of conversations C1 and C2 may be ordered as conversation C2 followed by conversation C1.

Other orderings, including multi-level orderings, are also possible. For example, a set of conversations may first be ordered by sender user according to the most recent (or least recent) messages in the set of conversations sent by each sender user. Then the conversations for each sender user may be ordered from most recent to least recent (or from least recent to most recent) based on the most recent (or least recent) message in each of the conversations for the sender user. For example, consider a set of conversations C1, C2, C3, and C4 wherein messages M1 and M2 are sent by user U1 and belong to conversation C1, messages M3 and M4 are also sent by user U1 but belong to conversation C2, messages M5 and M6 are sent by user U2 and belong to conversation C3, and messages M7 and M8 are also sent by user U2 but belong to conversation C4. Further, assume the messages from most recent to least recent are M5, M3, M6, M4, M1, M2, M7, and M8, then the set of conversations may be ordered C3, C4 for user U2 followed conversations C2 and C1 for user U1.

Conversation Listing

In accordance with some embodiments, a listing of conversations is generated and presented in a graphical user interface to a user 102 of system 106. The graphical user interface may be presented at the user 102's personal computing device. For example, the graphical user interface may be presented in a web browser application (e.g., INTERNET EXPLORER, SAFARI, CHROME, FIREFOX, OPERA, or other web browser application). In this case, system 106 may send web browser-executable instructions to the web browser at the user 102's device for presenting the conversation listing to the user 102. Such web browser-executable instructions may include, for example, Hyper-Text Markup Language (HTML) instructions, Cascading Style Sheet (CSS) instructions, JavaScript instructions, Flash plug-ins, Java applets, or other web standards-based or proprietary instructions executable by the user 102's web browser. Alternatively, the graphical user interface may be presented through a native application (e.g., a native mobile application developed for the ANDROID or IOS operating system, or a Windows application developed for a personal computer running Microsoft Windows). In this case, and possibly in the case where the graphical user interface is presented in a web browser, system 106 may send data to the user 102's computing device for presenting the conversation listing to the user 102. Such data may include message detail data about messages in the conversations such as, for example, identifiers of the messages, message class identifiers for the messages (e.g., whether a message is in a voice message, fax message, or text message class), message type identifiers (e.g., whether a phone message is a missed call message, a received call message, an outgoing call message, or a voicemail message), identifiers of senders and recipients of the messages (e.g., the e-mail addresses and/or account identifiers of the senders and recipients), bibliographic information about the senders and recipients (e.g., the sender's name, photo, title, education history, employment history), dates and times associated with the messages (e.g., the sent and/or received dates and times of the messages), and the content or content portions of the messages (e.g., a portion or digest of a text message, an thumbnail or reduced resolution image of a fax message, a voice-to-text translation of a voicemail message or a phone conversation). Such data may also include conversation detail data that specifies, for example, which messages belong to which conversations, a default ordering for the conversations in the listing, a default order for messages in each conversation in the listing, and default reply message control indicators for each conversation in the listing. Default reply message controls are explained in greater detail below.

Reply Message Controls

In accordance with certain embodiments, a conversation in the conversation listing presented in the graphical user interface to a user 102 is associated with graphical user interface controls for replying to a message in the conversation. The associated controls allow user 102A viewing the conversation listing to reply to the existing conversation message with a reply message in one of multiple predefined message classes. For example, if the predefined message classes or voice, fax, and text, then user 102A can reply to the existing conversation message with a reply voice, fax, or text message regardless of the message class the existing conversation message is in. The reply message is added to the same conversation as the existing conversation message. In this way, conversations having messages in different message classes are formed.

For example, consider a conversation C1 having a fax message M1 from user U1 and to which user D2 replied to with a text message M2 stating, "Received your fax. Please call when convenient." User U1 may view a conversation listing that includes conversation C1. The listing of conversation C1 may be associated with graphic user interface controls that allow user U1 to add a reply message to conversation C1. For example, the reply message can be a phone message M3. Both users U1 and U2 can easily follow conversation C1 in respective conversation listings presented to them. For example, user U1 may then view a conversation listing that includes conversation C1. The listing of conversation C1 presented to user U1 may show a sent fax message M1 sent to user U2, followed by a received text message M2 received from user U2, and a received phone call message M3 received from user U2. User U2 may be presented the same conversation C1 but with a received fax message M1 received from user U1, a sent text message M2 sent to user U2, and an outgoing phone call message M3 to user U2.

Default Reply Message Controls

In accordance with some embodiments, a conversation presented in a conversation listing is associated with default reply message controls for replying to an existing message of the conversation with a reply message in one of the predefined message classes. The default reply message controls may be for replying with a reply message that is in a different message class than the message class of the existing conversation message.

The default reply message controls can be appropriate for the class of the reply message. For example, if the message class of the reply message is text, then the default reply message controls may be a text entry area or other text entry field for entering a text message to send to the sender of the existing conversation message. If the message class of the reply message is fax, then the default reply message controls may be a file system file/folder selector for selecting a file or folder stored at or accessible to the user 102's personal computing device to send via a fax messaging protocol or as an e-mail attachment to the sender of the existing conversation message. If the message class of the reply message is phone, then the default reply message controls may be controls to launch a phone dialer or controls to automatically place an outgoing phone call to the sender of the existing conversation message.

Selecting the Default Reply Controls

In accordance with some embodiments, the message class of the default reply controls for replying to an existing conversation method of a conversation in a conversation listing is selected based on one or more default reply control selection factors. The default reply control selection factors can take into account a variety of factors suited for determining the best or most appropriate (or worst or least appropriate) message class for replying to the existing conversation message. While the message class or message type of the existing conversation message may be one of the default reply control selection factors, the factors may take other known information about the sender of the existing conversation message, the recipients of the existing conversation message, and/or the user replying to the existing conversation message.

While default reply control selection factors may be used to select (infer) a single most appropriate (or single least appropriate) message class for replying to the existing conversation message, the default reply control selections may also be used to select (infer) a set of appropriate (or inappropriate) message classes for replying to the existing conversation message. For example, the default reply control selection factors may be used to select (infer) the most (or least) appropriate message class and the next most (least) appropriate message classes for replying to the existing conversation message.

The default reply control selection factors may also be used to exclude any message classes which are not appropriate for replying to the existing conversation message. Thus, while embodiments described below use default reply control selection factors to select (infer) a single most appropriate message class for replying to the existing conversation message, it should be understood that the default reply control selection factors may be used to select (infer) one or more least appropriate message classes for replying to the existing conversation message, a set of multiple message classes appropriate for replying to the existing conversation message, and/or a set of message classes that are not appropriate for replying to the existing conversation message.

The default reply control selection factors described herein can be applied singularly or applied in combination. When applied in combination, some factors may be given more weight than other factors, possibly according to weighting algorithm that assigns weights to the factors. In other instances, some factors override other factors. Overall, the default reply control selection factors may be applied and combined in virtually any manner suitable for selecting, inferring, or determining a message class or message classes that are or that are not appropriate for replying to a given existing conversation message.

Default Reply Control Selection Factors—Sender's Preferred Reply Message Class

In accordance with some embodiments, the default reply control selection factors include a preferred message class that the sender of the given existing conversation message prefers to receive replies in. For example, user U1 may specify that she generally prefers to receive reply messages in the text message class. Such specification may be made by user U1 through a graphical user interface in the user profile or preferences settings for user U1 stored by system 106, for example. Such preference must be date and/or time constrained. For example, user U1 may specify that he or she prefers to receive reply messages in the phone message class Monday through Friday from 9:00 AM to 5:00 PM Pacific Time and in the text message class any other time of the week.

In one embodiment, the preferred reply message class for replying to a message is specified by a user when sending the message. For example, immediately before, during, or immediately after sending a message, the user sending the message may specify, through a graphical user interface, the preferred message class for replying to that message. For example, graphical user interface controls for preparing and sending a text message may also include controls for specifying a preferred manner of receiving a reply message to the text message. For example, the controls may allow the user to specify that he or she prefers to receive a reply phone message to the text message.

In some embodiments, the sender's preferred message class for the reply message may be indicated on the graphical user interface presenting the default reply message controls. For example, the message class for the default reply message controls associated with an existing conversation text message may indicate that the sender of the text message prefers to receive a phone call if replying to the existing conversation text message. Such default reply message controls may also include controls for dialing or connecting a phone call to the sender.

Default Reply Control Selection Factors—Sender's Current Availability

In accordance with some embodiments, the default reply control selection factors include a current user availability status of the sender of the existing conversation message. For this, system 106 may include a presence server such as, for example, the cross-platform presence server described in related U.S. Pat. No. 8,467,514, entitled "Cross-platform presence," and hereby incorporated by reference as if set forth entirety herein.

The presence server can monitor and evaluate the statuses of the personal computing devices used by the sender. For example, the sender may use a desktop computing device while at his or her work and a cell phone at various times throughout the day. The presence server can determine the sender's device statuses based on information communicated from the sender's devices to the presence server. For example, the presence server can determine the sender's device statuses based on inbound or outbound communications from and to system 106. Example device statuses that may be associated with one of the sender's device may include, for example, "on the phone," "phone is ringing," "do not disturb," "unavailable," "busy," "out of the office," "away from desk," "at home," "mobile," and "traveling".

The sender's current availability may be determined based on the statuses of the sender's devices. For example, the sender's current availability may be determined based on an aggregate of the sender's device statuses. For example, if the device status of one of the sender's devices (e.g., the sender's desktop phone at work) indicates that the sender is not currently available to receive messages at that device and the device status of another of the sender's devices (e.g., the sender's cell phone) indicates that the sender is currently available to receive messages at the other device, then the current availability of the sender may be determined as unavailable based on device priorities associated with the sender's devices. For example, a higher (or lower) priority may be associated with the sender's desktop phone at work compared to the priority associated with the sender's personal cell phone such that if the device status of the sender's desktop phone at work indicates the sender is busy then the sender is considered currently unavailable even if the device status of the sender's cell phone indicates the sender is currently available. Similarly, if the device status of the sender's desktop phone at work indicates the sender is available then the sender may be considered to be currently available even if the device status of the sender's cell phone indicates the sender is currently busy.

The sender's current availability as determined by the presence server can be used as a factor in selecting the default reply controls for the existing conversation message. For example, if the sender's current availability indicates the sender is busy or otherwise unavailable, the default reply controls may be ones that allow the sender to read and reply to a reply message sent using the controls in an asynchronous manner or a manner where it is not expected that the sender reply immediately. For example, in a situation where the sender is currently busy, the default reply controls may be controls for sending a text message, a fax message, or an e-mail message to the sender as opposed to controls for making a phone call to the sender or sending an online chat message or videoconferencing invitation to the sender. In addition, if the sender is unavailable but currently using one or more of his personal computing devices, the default reply controls may be ones that are optimized for one or more of those devices. If, for example, the sender's current status is "Do Not Disturb" and is presently using his cell phone to participate on a conference call, the default reply control may be for sending a text message to that phone. In this way, when the sender is no longer unavailable (e.g., in this example, finishes his or her conference call), the asynchronous messages he or she received during that time will be readily accessible.

In some embodiments, the sender's current availability is visually indicated in the conversation listing. For example, text, an icon, or graphic associated with the default reply controls for an existing conversation message may indicate whether the sender of the existing conversation message the sender is on the phone, does not want to be distributed, or is unavailable, busy, out of the office, away from his or her desk, at home, mobile, or traveling.

If the sender's current availability status indicates that the sender is currently available, the statuses of the sender's devices as determined by the presence server can also be used to determine the most appropriate device at which to contact the sender. In particular, the default reply controls that are selected can be for sending a message to one of the sender's devices at which the sender is most likely to be reached. For example, if the device statuses of the sender indicate that the sender is currently available at his or her work desktop phone, then the default reply controls can be for calling the sender at the work desktop hone. As another example, if the device statuses of the sender indicate that the sender is currently available at his or cell phone, then default reply controls can be for calling the sender at her cell phone or sending a text message at her cell phone.

Exemplary Graphical User Interface

FIG. 2A illustrates a wireframe of an exemplary graphical user interface (GUI) 204 presenting a conversation timeline 206, according to some embodiments of the present invention. GUI 204 may be presented on a video display 202 of a user 102's, say user 102A's, personal computing device. The video display 202 may be part of or operatively coupled to user 102A's personal computing device. Video display 202 may be part of a desktop computer monitor, television, car infotainment display, or other video display device. Video display 202 may be overlaid with a touch sensitive surface to form a touchscreen. The touch sensitive surface may be configured to detect finger or stylus haptic or tactile contact and movement on and across the touch sensitive surface using capacitive sensing or other touch sensing technology. Video display 202 may instead be part of an optical head mounted display of a wearable computing device.

User input for selecting and interacting with the GUI 204 can be made in a variety of different ways according to the capabilities of the particular personal computing device the user 102A is using. For example, user 102A may use a pointing device (e.g., a mouse or touchpad) and keyboard to provide user input when using a desktop, workstation, or laptop computer; use touch gestures to provide input when using a cell phone or tablet computer with a touchscreen; or use voice commands or eye movements to provide input when using a wearable computing device with an optical head-mounted display.

As shown, conversation listing 206 presents a list of one or more conversation cards 208. In this example, the listing is a single column of conversation cards along, parallel to, or substantially parallel with the long-axis of the video screen 202. However, the listing could just as easily be a grid of conversation cards having multiple rows and multiple columns of conversation cards or a single row of conversation cards.

In addition, the listing could be across multiple tabs, with each tab containing one or more conversation cards that take up the entire video screen 202. The conversation cards 208 of conversation listing 206 may be ordered in any convenient manner including the orderings discussed above. Each conversation card 208 may be a different size, and there is no requirement that each conversation card 208 have the same user interface dimensions or shape.

Conversation listing 206 may be scrollable if there are more conversation cards 208 to present in the listing 206 than can fit within the boundaries of the video display 202. For this, GUI 206 may have a scroll bar (not shown) for scrolling the listing 206. Optionally, a scroll bar may not be displayed when the conversation listing 206 is scrollable with touch gestures such as a finger flick or swipe gesture. In these instances where conversation listing 206 is scrollable with touch gestures, GUI 204 may display a visual indicator (e.g., text, a graphic, or an icon) that more conversation cards 208 currently off-display are available for viewing through scrolling.

In some embodiments, the listing 206 is generated for a particular user 102. Specifically, the listing 206 is generated for the user 102, say user 102A, viewing the listing 206 on screen 202. In some embodiments, the user 102A authenticates with system 106 so that the user 102A's identity is established. The listing 206 presented to user 102A includes conversation cards 208 for conversations in which the user 102A is a sender or a recipient of a message or message in the conversations. However, it should be understood that the listing 206 can include conversation cards 208 for any set of conversations.

Figure 2B:
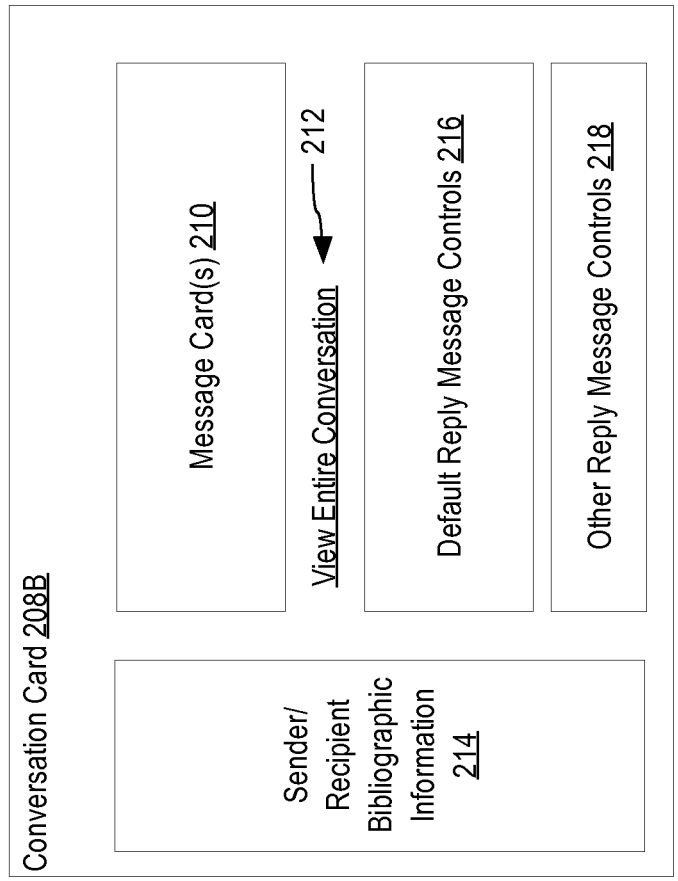
FIG. 2B illustrates a wireframe of an exemplary conversation card that can be presented in a conversation timeline, according to certain embodiments of the present invention.

FIG. 2B illustrates a wireframe of an exemplary conversation card 208B that may be presenting in the conversation timeline 206 of FIG. 2A, according to some embodiments of the present invention. Each conversation card 208 of the listing 206 represents a conversation having one or more messages. For a conversation having multiple messages, the messages may be belong to different messages classes. For example, each of the multiple messages may be in a voice message class, a text message class, a fax message class, an e-mail message classes, or chat message class.

Conversation card 208B contains one or more message card(s) 210. Each message card 210 corresponds to a message of the conversation represented by conversation card 208B. In some graphical user interface states, conversation card 208B contains only one message card 210 corresponding to the most recent message of the conversation. If there are multiple messages in the conversation, user interface controls 212 for viewing the entire conversation may be provided on the conversation card 208B. When controls 212 are activated, message cards 210 for all of the message in the conversation may be presented on conversation card 208B. If there are too many messages to fit in the boundaries of the video screen 202, the listing of the message cards 210 on the conversation card 208B may be scrollable like conversation listing 206.

Conversation card 208B may also contain sender and recipient bibliographic information 214. Bibliographic information 214 may contain one or more user details about one or more senders and/or one or more recipients of one or more messages of the conversation. The user details may include any information about sender(s) and/or recipient(s) useful to the viewer of the conversation card 208B. In accordance with one or more embodiments, the user details include one or more of the following user details for each of one or more senders and/or one or more recipients of one or more messages of the conversation:

a photo or avatar of the sender or recipient;
a name of the sender or recipient;
a title of the sender or recipient;
a company or organization with which the sender or recipient is affiliated with; and
the sender or recipient's current status.

In accordance with some embodiments, some of the bibliographic information 214 is obtained from a third-party online service (e.g., FACEBOOK, LINKEDIN, etc.) that the sender or recipient has agreed to share with system 106.

In accordance with some embodiments, the bibliographic information 214 is presented only for the sender of the most recent message in the conversation. In some embodiments, the bibliographic information 214 is presented only for the sender of the message corresponding to a currently selected (e.g., by tap touch gesture, mouse over, mouse click, etc.) message card 210 on the conversation card 208B.

In some embodiments, the bibliographical information 214 excludes user details for the user viewing the conversation card 208B who may, nevertheless, be a sender or recipient of at least one message of the conversation.

In some embodiments, the bibliographical information 214 includes user details for each sender and each recipient (except for perhaps the user viewing the conversation card 208B) of the most recent message in the conversation.

In some embodiments, the bibliographic information 214 includes user details for each sender and each recipient (except for perhaps the user viewing the conversation card 208B) of a message corresponding to a currently selected message card 210 on the conversation card 208B.

In some embodiments, the bibliographic information 214 is presented on the message cards 210 in which the portion of the bibliographic information 214 presented on any particular message card 210 pertains to only the sender and/or the recipients of the message corresponding to that particular message card 210.

Conversation card 208B may optionally include default reply message controls 216 for creating and adding a new message to the conversation. Sending and delivery of the new message may be facilitated by system 106. The default reply message controls 216 may be selected or inferred as described above.

In some embodiments, the default reply message controls 216 include controls for preparing a new message in a particular message class. The controls for preparing the message may be specific to the particular message class. For example, controls for preparing a message in the voice message class may include controls for launching a telephone dialer application, controls for preparing a message in the text message class may include text entry controls, and controls for preparing a message in a fax message class may include a file system browser for selecting file or folder in a file system.

By default, the default reply message controls 216 may be for replying to the most recent message in the conversation. In other embodiments, the default reply message controls 216 are for replying to another message in the conversation such as, for example, a message corresponding to a currently selected message card 210.

The default reply message controls 216 may include controls for selecting one or more recipients of the new message. By default, some recipients may be automatically selected from the sender and recipients of the message to which the new message replies. The default reply message controls 216 may include controls for removing automatically selected recipients.

In some embodiments, some or all of the controls of the default reply message controls 216 are presented on a pop-up or overlay panel of conversation card 208B in response to the user activating controls on the conversation card 208B.

Conversation card 208B may also include other reply message controls 218 for replying to a message of the conversation with a reply message in other message classes. For example, the default reply message controls 216 may be for replying in a text message class and the other reply message controls 218 may include controls for replying in a phone message class and a fax message class.

Each message card 210 may include the content or a portion of the content of the message represented by that message card 210. If the message card 210 represents a message in a text message or chat message class, then the message card 210 can include the text of the text or chat message. If the message card 210 represents a message in a phone message class, then the message card 210 can indicate the type of phone message. For example, the message card 210 can indicate whether the phone message is a missed phone call, a received phone call, an outgoing phone call, or a voicemail message. If the phone message is a received phone call or an outgoing phone call that was recorded by system 106, then the message card 210 may include user interface controls for playing back the recording of the phone call. Similarly, if the phone message is a voicemail message, then the message card 210 may include user interface controls for playback back the voicemail recording.

In some embodiments, the system 106 performs a speech-to-text translation of the phone call or the voicemail message and the message card 210 presents the text or a portion of the text resulting from the translation. By doing so, keyword-based searches of message cards 210 representing messages in the voice message class is possible. If the message card 210 represents a message in the fax message class, the message card 210 may present a thumbnail image or other image of the fax and/or may present a link for downloading the fax as a digital document or file from system 106.

A message card 210 representing a message of a conversation may include other information such as identifiers (e.g., names) of the senders and/or recipients of the message and dates and time associated with sending and/or receiving the message.

Exemplary Components of a Heterogeneous Messaging System

Figure 3:
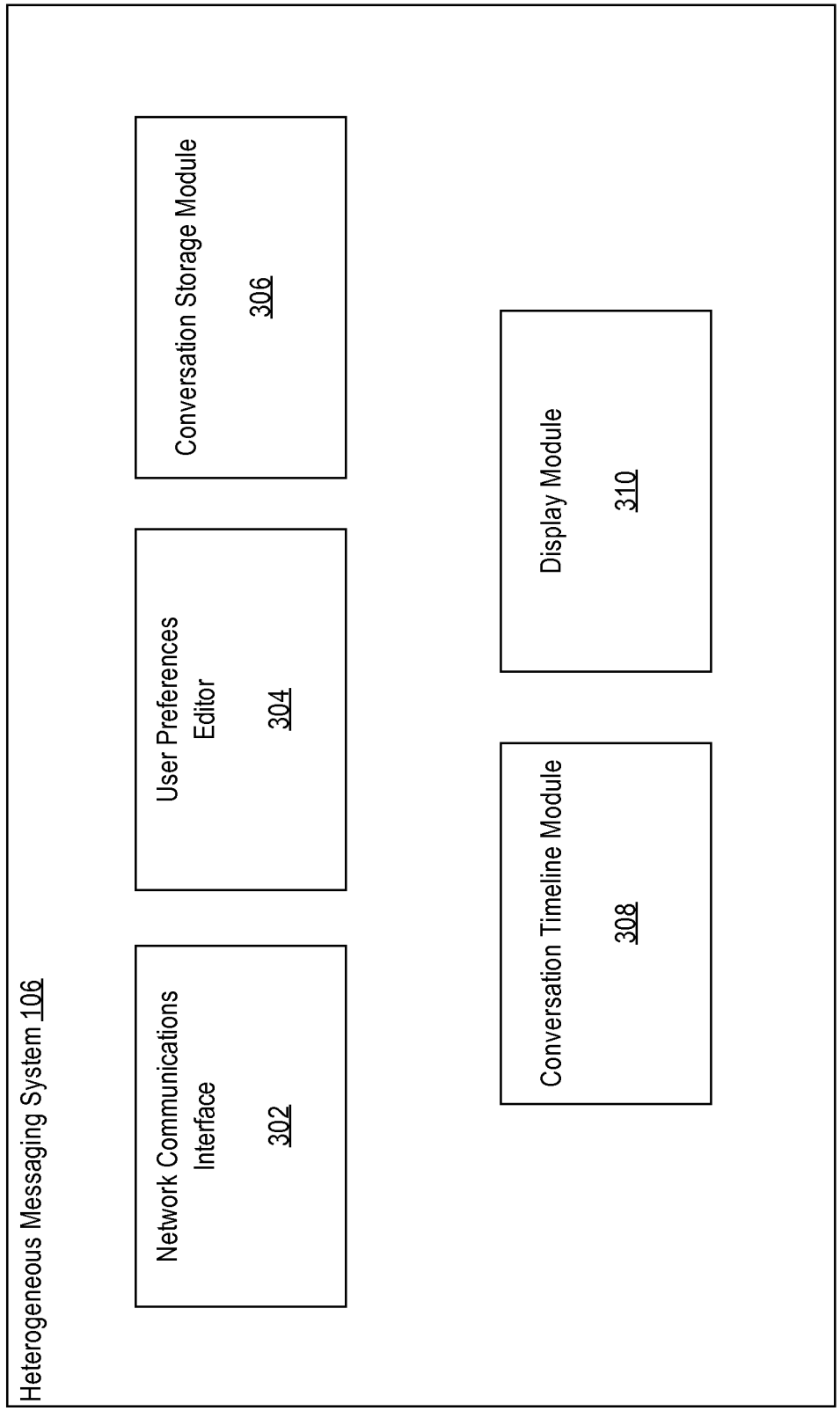
FIG. 3 illustrates exemplary components of a heterogeneous messaging system, according to certain embodiments of the present invention.

Referring now to FIG. 3, exemplary components and modules of heterogeneous messaging system 106 of FIG. 1 are illustrated in block diagram format and in accordance with certain embodiments of the invention. While the exemplary components and modules are shown in FIG. 3 as part of system 106, some or all of the components and modules may instead be part of software or programmable logic executing at users' personal computing devices, for example, as components and modules of a native application or a web browser-based web application. Further still, functionality performed by the components and modules may be distributed amongst the system 106 and software or programmable logic executing at a user's personal computing device. Thus, a portion of a component or module may be implemented at system 106 and another portion of the component or module may be implemented at users' personal computing devices.

A network communications interface 302 is provided in association with the heterogeneous messaging system 106 for receiving data from and sending data including message data to the users 102. The users 102 can send and receive multiple different classes of message data to and from system 106 via the network 104. For example, the different classes of message data may include phone message data, text message data, fax message data, e-mail message data, and chat message data.

Users 102 may access a web site associated with heterogeneous messaging system 106. For example, system 106 may host a heterogeneous messaging web site where users 102 can send and receive messages in different messages classes to and from other others 102 of the system 106.

A user preferences editor 304 is provided to users 102 for editing and/or entering their messaging preferences including preferences for receiving reply messages through a conversation timeline. For example, a user 102 may specify that she prefers to receive reply messages at his or her work phone Monday through Friday during business hours in the phone message class but at his or her personal cell phone all other times of the week in the text message class.

A conversation storage module 306 is provided for storing one or more databases that include, but are not limited to, conversations between the users 102. The conversation storage module 306 can utilize any type of storage device or medium to store the database. For example, the conversation storage module 306 can store the databases in hard drives, on CD or DVD ROMS, in DRAM, and so forth. Any type of storage device or storage medium for storing information about the conversations and the messages thereof, profile data associated with the users 102, or any other information associated with the users 102 is within the scope of various embodiments. According to some embodiments, the conversation storage module 306 can store the conversation timeline generated for users 102. The databases on the storage device may be any sort of hardware or software (or combination thereof) that can store and retrieve information, including without limitation commercially-available relational or XML database management systems, proprietary database management systems, flat files, or file systems (distributed or otherwise).

A conversation timeline module 308 is also provided in association with the system 106. The conversation timeline module 308 creates the conversation stored in conversation storage module 306 including organizing messages into conversations, ordering messages within conversations, and ordering sets of conversations. Conversation timeline module 308 also provides other functionality such as selecting the default reply message class or classes for a conversation and obtaining bibliographic data for senders and/or recipients of conversation messages.

A display module 310 may be associated with system 106 for presenting a conversation timeline to users 102 in a graphical user interface. In some embodiments, display module 310 accomplishes presentation of a conversation timeline by generating and sending web browser executable instructions for presenting the conversation timeline in users' web browsers at the users' personal computing devices. In other embodiments, display module 310 accomplishes presentation of conversation timeline using a native graphical user interface software development kit (SDK) such as COCOA TOUCH for APPLE IOS-based devices or ANDROID SDK for ANDROID-based devices.

Although FIG. 3 shows various modules associated with the heterogeneous messaging system 306 (e.g., the network communications interface 302, the user preferences editor module 304, the conversation storage module 306, and the conversation timeline module 308), fewer or more modules may be associated with the system 306 and still fall within the scope of various embodiments. For example, while in some embodiments the heterogeneous messaging system handles (e.g., sends and receives) the messages between users that are part of conversations, the heterogeneous message system does not handle conversation messages in other embodiments. For example, the heterogeneous message system may store conversations in conversation database that refer to messages stored in other systems, such as an external or third-party messaging system. Thus, it is not a requirement that the heterogeneous messaging system send and receive messages or store messages that are part of conversations.

Example Implementing Mechanism

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
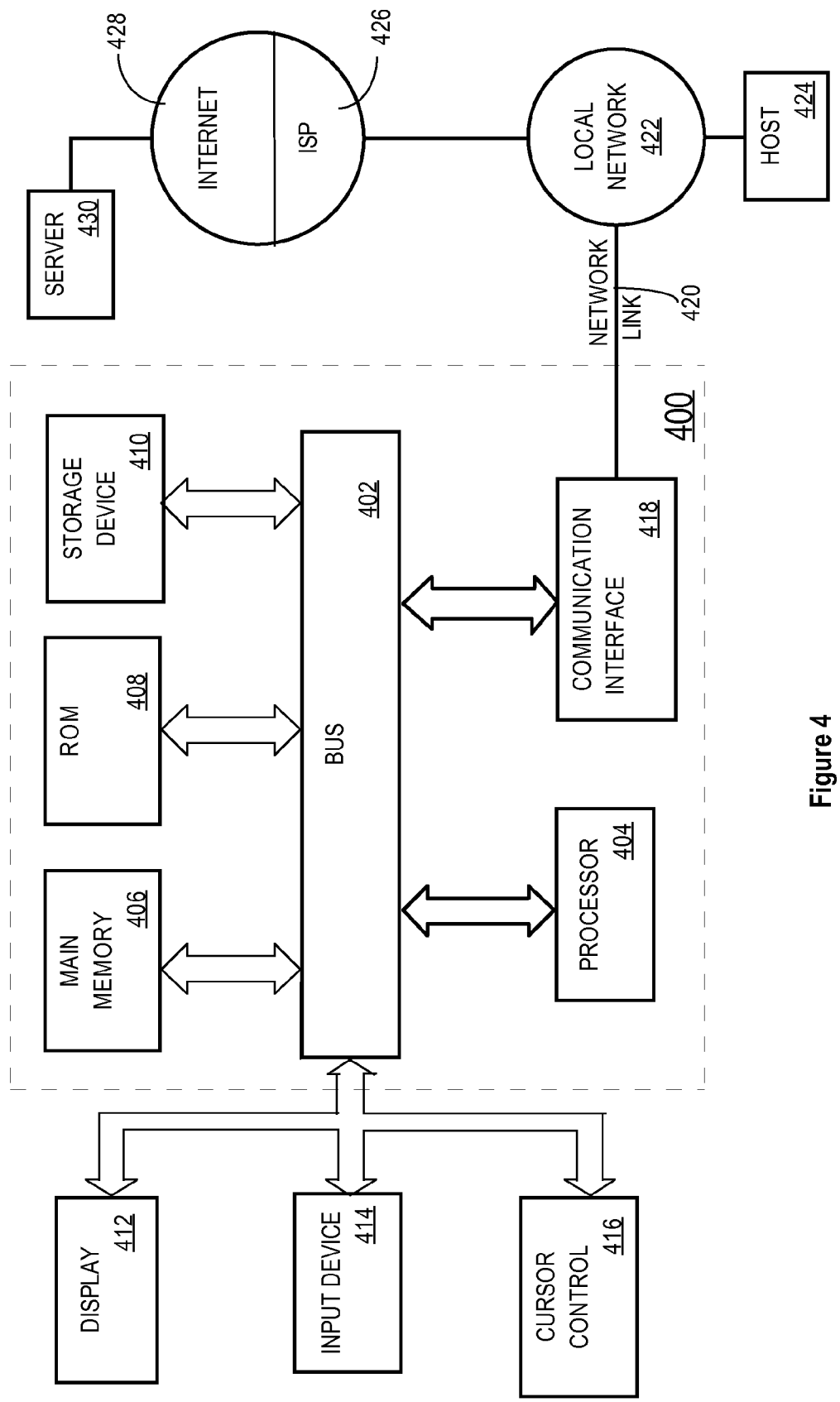
FIG. 4 is a block diagram of a computer system on which embodiments of the present invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., the x-axis) and a second axis (e.g., the y-axis), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD- or DVD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable other skilled in the art to best utilize the invention and various embodiments with various modifications as are suited to the requirements of the particular implementation at hand or the particular use contemplated.

What is claimed is:

1. A method for maintaining a plurality of conversations among users, the method comprising:
   associating each conversation with an original message;

grouping together a plurality of messages between the users replying to the original message, wherein the plurality of messages includes messages belonging to two or more different message classes;

causing display at a computing device of a graphical representation of the plurality of conversations to one of the users;

upon detecting a selection of one of the plurality of conversations, causing display of a graphical representation of the selected conversation to the one of the users;

determining, based on one or more default reply control selection factors, a message class for a default reply message in the selected conversation, wherein one of the one or more default reply control selection factors is a sender's preferred reply message class; and causing display at the computing device of a single default reply message control for adding a new message to the selected conversation in the determined message class.

2. The method of claim 1, further comprising causing display of a graphical representation of a conversation timeline to one of the users; wherein the conversation timeline comprises a listing of a plurality of conversations in chronological order of most recent or least recent messages of the plurality of conversations.

3. The method of claim 1, wherein each of the plurality of conversations comprises a plurality of messages between at least one user to which the graphical representation of the conversation is displayed and another of the users.

4. The method of claim 1, wherein at least one of the plurality of messages is a predefined message class selected from a group consisting of voice, fax, and text.

5. The method of claim 1, wherein causing display of the graphical representation of the selected conversation comprises generating browser-executable instructions for execution by a browser application at a personal computing device of the user to which the graphical representation of the selected conversation is presented.

6. The method of claim 1, wherein graphical representation of the selected conversation comprises a listing of the plurality of messages of the selected conversation in chronological order of dates and times associated with the plurality of messages of the selected conversation.

7. The method of claim 6, wherein the listing of the plurality of messages lists the plurality of messages in a chronological order from least recent to most recent according the dates and times associated with the plurality of messages.

8. The method of claim 1, further comprising:
determining a phone number associated with a message of the plurality of messages;
determining one or more user profile details associated with the phone number;
wherein causing display of the graphical representation of the selected conversation comprises causing display of the one or more user profile details.

9. The method of claim 8, wherein determining the one or more user profile details associated with the phone number comprises providing the phone number to a third party service and obtaining the one or more user profile details from the third-party service in response to providing the phone number.

10. The method of claim 1, wherein the sender's preferred reply message class, was previously selected by the sender; and wherein the method further comprises the computing device determining the message class based at least in part on data indicating a preferred reply message class of the sender.

11. The method of claim 1, wherein when the sender selects that a text message class is the sender's preferred reply message class, the method includes causing display at the computing device of a single default reply message control in the text message class.

12. The method of claim 1, wherein when the sender selects that a phone message class is the sender's preferred reply message class, the method includes causing display at the computing device of a single default reply message control in the phone message class.

13. One or more non-transitory computer-readable media storing instructions which, when executed by one or more computing devices, causes the one or more computing devices to perform a method for maintaining a plurality of conversations among users, the method comprising:
associating each conversation with an original message;
grouping together a plurality of messages between the users replying to the original message, wherein the plurality of messages includes messages belonging to two or more different message classes;
causing display at a computing device of a graphical representation of the plurality of conversations to one of the users;
determining, based on one or more default reply control selection factors, a message class for a default reply message in the selected conversation, wherein one of the one or more default reply control selection factors is a sender's preferred reply message class; and
causing display at the computing device of a single default reply message control for adding a new message to the conversation in the determined message class.

14. The one or more non-transitory computer-readable media of claim 13, the method further comprising:
causing display of a graphical representation of a conversation timeline to one of the users;
wherein the conversation timeline comprises a listing of a plurality of conversations in chronological order of most recent or least recent messages of the plurality of conversations.

15. The one or more non-transitory computer-readable media of claim 13, wherein the selected conversation comprises a plurality of messages between at least the user to which the graphical representation of the conversation is displayed and another of the users.

16. The one or more non-transitory computer-readable media of claim 13, wherein at least one of the plurality of messages is a predefined message class selected from a group consisting of voice, fax, and text.

17. The one or more non-transitory computer-readable media of claim 13, wherein causing display of the graphical representation of the selected conversation comprises generating browser-executable instructions for execution by a browser application at a personal computing device of the user to which the graphical representation of the selected conversation is presented.

18. The one or more non-transitory computer-readable media of claim 13, wherein graphical representation of the conversation comprises a listing of the plurality of messages of the selected conversation in chronological order of dates and times associated with the plurality of messages of the selected conversation.

19. The one or more non-transitory computer-readable media of claim 18, wherein the listing of the plurality of messages lists the plurality of messages in a chronological order from least recent to most recent according the dates and times associated with the plurality of messages.

20. The one or more non-transitory computer-readable media of claim 13, the method further comprising:
   determining a phone number associated with a message of the plurality of messages;
   determining one or more user profile details associated with the phone number;
   wherein causing display of the graphical representation of the selected conversation comprises causing display of the one or more user profile details.

21. The one or more non-transitory computer-readable media of claim 20, wherein determining the one or more user profile details associated with the phone number comprises providing the phone number to a third-party service and obtaining the one or more user profile details from the third-party service in response to providing the phone number.

22. The one or more non-transitory computer-readable media of claim 13, wherein the sender's preferred reply message class was previously selected by the sender; and wherein the method further comprises determining the message class based at least in part on data indicating a preferred reply message class of the sender.

23. The one or more non-transitory computer-readable media of claim 13, wherein one of the one or more default reply control selection factors is a sender's device status; and wherein the method further comprises determining the message class based at least in part on data indicating a status of a device of the sender.

24. The one or more non-transitory computer-readable media of claim 13, wherein one of the one or more default reply control selection factors is a sender's device location; and wherein the method further comprises determining the message class based at least in part on data indicating a location of a device of the sender of a message of the plurality of messages.

25. A computing device, comprising:
   one or more processors;
   memory for storing instructions which, when executed by the one or more processors, cause performance of a method for maintaining a plurality of conversations among users, the method includes:
      associating each conversation with an original message;
      grouping together a plurality of messages between the users replying to the original message, wherein the plurality of messages includes messages belonging to two or more different message classes;
      causing display of a graphical representation of the plurality of conversations to one of the users;
      upon detecting a selection of one of the plurality of conversations, causing display of a graphical representation of the selected conversation to the one of the users;
      determining, based on one or more reply control selection factors, a message class for a default reply message in the selected conversation, wherein one of the one or more default reply control selection factors is a sender's preferred reply message class; and
      causing display of a single default reply message control for adding a new message to the conversation in the determined message class.

26. A system comprising:
   one or more processors;
   memory for storing instructions which, when executed by the one or more processors, cause performance of a method for maintaining a plurality of conversations among users, the method includes:
      associating each conversation with an original message;
      grouping together a plurality of messages between the users replying to the original message, wherein the plurality of messages includes messages belonging to two or more different message classes;
      causing display of a graphical representation of the plurality of conversations to one of the users;
      upon detecting a selection of one of the plurality of conversations, causing display of a graphical representation of the selected conversation to the one of the users;
      determining, based on one or more reply control selection factors, a message class for a default reply message in the selected conversation, wherein one of the one or more default reply control selection factors is a sender's preferred reply message class; and
      causing display of a single default reply message control for adding a new message to the conversation in the determined message class.

27. The system of claim 26, wherein determining the message class for the default reply message in the selected conversation includes:
   identifying a single most appropriate message class for replying to a message in the selected conversation.

28. The system of claim 26, wherein determining the message class for the default reply message in the selected conversation includes:
   accessing the memory to retrieve at least one date and/or time constraint associated with user preferences.

* * * * *